(12) United States Patent
Azuma et al.

(10) Patent No.: US 7,961,268 B2
(45) Date of Patent: Jun. 14, 2011

(54) LIQUID CRYSTAL DISPLAY DEVICE

(75) Inventors: Yuji Azuma, Fujisawa (JP); Masaki Tsubokura, Mobara (JP); Shimon Itakura, Mobara (JP); Seigo Abo, Hitachi (JP)

(73) Assignees: Hitachi Displays, Ltd., Chiba-ken (JP); Panasonic Liquid Crystal Display Co., Ltd., Hyogo (JP)

( * ) Notice: Subject to any disclaimer, the term of this patent is extended or adjusted under 35 U.S.C. 154(b) by 117 days.

(21) Appl. No.: 12/068,631

(22) Filed: Feb. 8, 2008

(65) Prior Publication Data

US 2008/0192171 A1  Aug. 14, 2008

(30) Foreign Application Priority Data

Feb. 8, 2007  (JP) ................................. 2007-028717

(51) Int. Cl.
  *G02F 1/1333*  (2006.01)
(52) U.S. Cl. ................ 349/58; 349/59; 349/60
(58) Field of Classification Search ............... 349/58–60
  See application file for complete search history.

(56) References Cited

U.S. PATENT DOCUMENTS 6,762,807 B2 *  7/2004  Lee et al. .................... 349/58
7,283,118 B2  10/2007  Nagatani
2005/0276074 A1 *  12/2005  Ryu ............................. 362/613
2006/0050195 A1 *  3/2006  Choi et al. .................. 349/58
2006/0170839 A1 *  8/2006  Yamamoto et al. ......... 349/58

FOREIGN PATENT DOCUMENTS

JP  2003-162901  6/2003

* cited by examiner

*Primary Examiner* — David Nelms
*Assistant Examiner* — Phu Vu
(74) *Attorney, Agent, or Firm* — Stites & Harbison PLLC; Juan Carlos A. Marquez, Esq.

(57) ABSTRACT

The present invention provides a liquid crystal display device which can enhance display quality and reliability by preventing the intrusion of foreign materials to a display screen of a liquid crystal display panel thus preventing the adhesion of the foreign materials to the display screen of the liquid crystal display panel. On an upper surface of a peripheral portion of a split mold frame housing a liquid crystal display panel, rubber cushions which are split in four are arranged at corner portions of the peripheral portion in an adhesive manner. With respect to the split portions of the rubber cushions at the corner portion, on a long-side mold frame, extending portions formed by extending both end portions of the long-side rubber cushion larger than a predetermined length are integrally formed and are arranged in an adhesive manner. On a short-side mold frame, a short-side rubber cushion having a predetermined length is arranged. A connecting portion is formed at the corner portion in a state that the end portions of the long-side rubber cushion and short-side rubber cushion intersect with each other in an approximately T-shape.

10 Claims, 7 Drawing Sheets

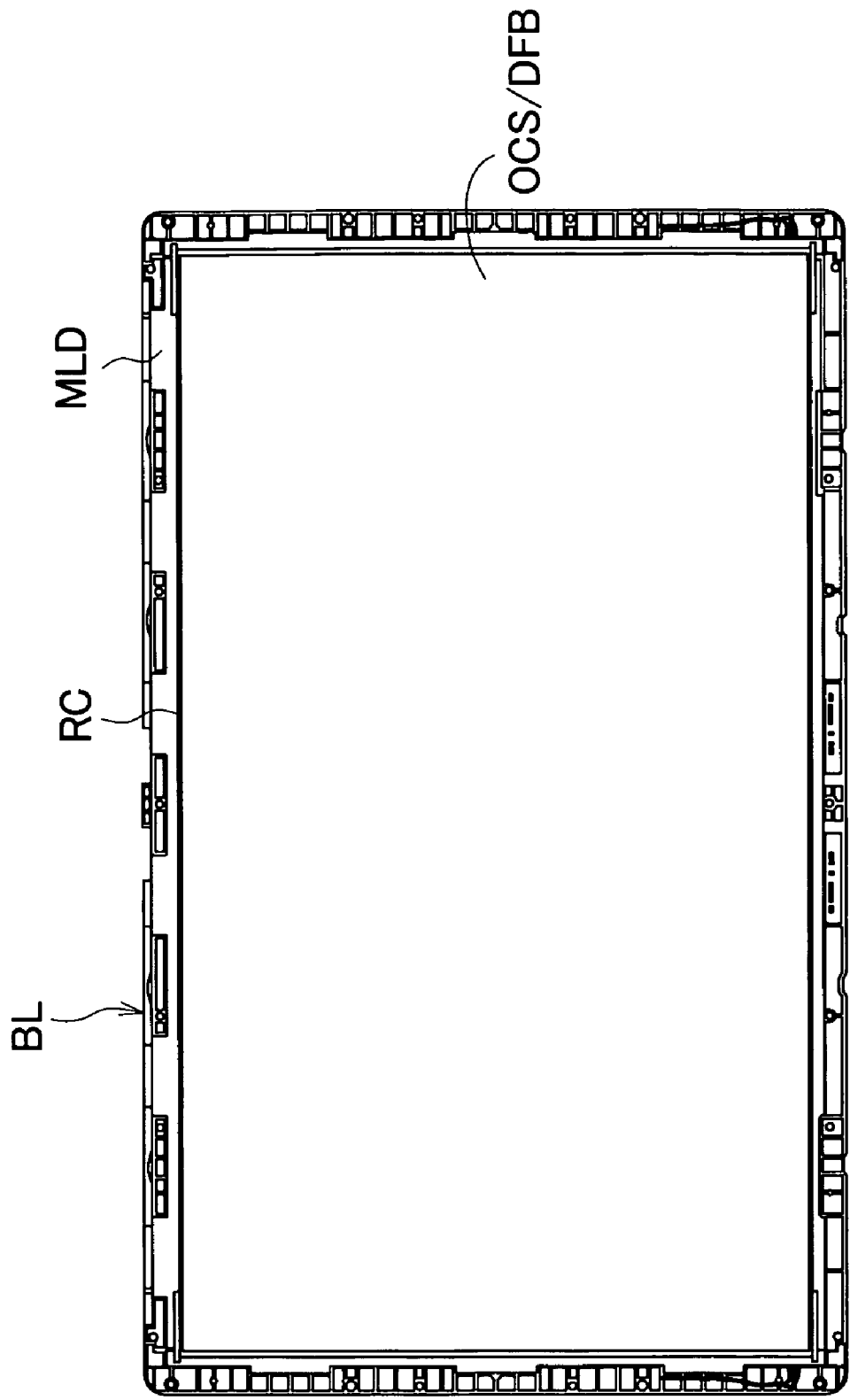

LIQUID CRYSTAL DISPLAY DEVICE

The present application claims priority from Japanese application JP2007-028717 filed on Feb. 8, 2007, the content of which is hereby incorporated by reference into this application.

BACKGROUND OF THE INVENTION

The present invention relates to a liquid crystal display device having a backlight for radiating a light-source light on a back surface of a liquid crystal display panel, particularly to the structure which interrupts the intrusion of foreign materials through a gap formed in a joint portion between the liquid crystal display panel and the backlight. To be more specific, the present invention relates to the structure of a joint portion at a corner portion of a resilient member.

A liquid crystal display panel constituting a liquid crystal display device is an image display device which is basically configured such that a liquid crystal layer is sealed between two substrates consisting of a first substrate and a second substrate preferably formed of a glass substrate, and an image is displayed by making use of a change of alignment direction of liquid crystal in response to an electric field applied to the liquid crystal from pixel selection electrodes formed on the substrate. A full transmissive liquid crystal display device which has been most popularly used currently adopts the structure where a light-source light projected from a backlight mounted on a back surface of a liquid crystal display panel is polarized at an angle of approximately 90 degrees, and the polarized light is allowed to pass through a polarizer thus forming an electronic latent image into a visible image which can be observed with naked eyes.

In the image display device using such a non-light-emitting-type liquid crystal display panel, the electronic latent image formed on the liquid crystal display panel is visualized with the use of the external illumination means. The external illumination means is constituted by mounting an illumination device on a back surface or a front surface of the liquid crystal display panel except for the structure which makes use of a natural light. Particularly, a display device which requires high brightness adopts the structure which mounts the illumination device on the back surface of the liquid crystal display panel as a mainstream. Such an illumination device is referred to as a direct back light.

Here, the term "direct backlight" is an expression in contrast with a so-called side-backlight which performs illumination by forming linear light sources having the same constitution on a side of a light guide plate mounted on a back surface of the liquid crystal display panel.

In the liquid crystal display device which uses the above-mentioned direct backlight as the illumination light source, to realize the narrowing of a picture frame, the reduction of weight and the integration of the backlight with the liquid crystal display panel, the liquid crystal display panel is accommodated and held in the inside of a frame-shaped metal frame formed of a metal molded body in a fixed manner, and the metal frame is mechanically fixed to respective sides of a frame-shaped mold casing formed of a resin molded body using bolts or the like in which a diffusion plate, linear light sources, a reflector and the like are accommodated.

The direct backlight is mainly constituted of a reflection sheet arranged to face the back surface of the liquid crystal display panel in an opposed manner, a light diffusion plate arranged on a front-surface side of the reflection sheet, and a fluorescent lamp arranged between the reflection sheet and the light diffusion plate. On these constitutional members, a back plate formed in an approximately trough shape, for example, a side mold frame mounted on the back plate, a frame-shaped mold frame in which the back plate mounting the side mold frame thereon is fitted and the like are stacked in an integral manner thus constituting the direct backlight.

In the backlight having such a constitution, a frame-shaped resilient member such as a silicon rubber sheet is adhered to the frame-shaped mold frame using an adhesive material, and the liquid crystal display panel is mounted on and adhered to an upper surface of the resilient member. Further, in the same manner as the above-mentioned resilient member, a frame-shaped resilient member such as a silicon rubber sheet is adhered to a lower surface of the resilient member using an adhesive material, and are mounted on and adhered to a peripheral portion of the resilient member thus integrally forming the optical compensation sheet stacked body and the diffusion plate with the mold frame.

To be more specific, as shown in FIG. 7 which is a plan view of an essential part of a backlight BL, a diffusion plate DFB arranging an optical compensation sheet stacked body OCS on a back surface side thereof is mounted on the frame-shaped mold frame MLD. A rubber cushion RC constituting a resilient member and applying an adhesive layer to one surface thereof is combined with and adhered to an upper-surface side peripheral portion of the mold frame MLD. Then, the liquid crystal display panel is mounted on the rubber cushion RC to provide the liquid crystal display device.

However, in the liquid crystal display device having such a constitution, a foreign material is adhered to a display screen of the liquid crystal display panel. Accordingly, patent document 1 (JP-A-2003-162901 (corresponding to U.S. Pat. No. 7,283,118)) discloses a backlight and a liquid crystal display device which prevent the intrusion of a foreign material into a display part at the time of exchanging a lamp by mounting a closure member (resilient member) among a diffusion plate, a frame member and a lamp housing thus closing a gap defined between the diffusion plate and the frame member.

SUMMARY OF THE INVENTION

The mold frame which mounts the liquid crystal display panel having such a constitution thereon adopts a split-frame type for satisfying a recent demand for the enhancement of productivity of the liquid crystal display device, the reduction of manufacturing cost, the reduction of number of manufacturing steps and the like. In manufacturing the split-frame-type mold frame, instead of using the frame structure which is integrally formed in a frame shape, the mold frame is manufactured in a state that the mold frame is split in four to form rods corresponding to respective sides of the mold frame, and these rods are combined into a frame shape.

In this split-frame-type mold frame MLD, as shown in FIG. 8A which is a perspective view showing an essential part of a corner portion, a long-side mold frame LMD formed by molding in a rod shape, for example, and a short-side mold frame SMD formed by molding in a rod shape, for example, are combined with and adhered to each other in the direction indicated by an arrow at both end portions thereof thus assembling the mold frame MLD in a frame shape as shown in FIG. 8B which is a plan view of an essential part of the mold frame MLD.

However, in the liquid crystal display device with the direct backlight having such a constitution, as shown in FIG. 8B, at a split portion of the corner portion of the split-type mold frame MLD, a gap G bent in a crank shape is formed in a seam portion where the long-side mold frame LMD and the short-side mold frame SMD are combined with each other in view of size tolerance and operability.

Further, to an inner-peripheral-portion side of the mold frame MLD assembled in a frame shape as described above, a rubber cushion RC for mounting the liquid crystal display panel is adhered. The rubber cushion RC is also adhered and arranged in a 4-split manner in the same manner as the mold frame MLD. Also in this case, as shown in FIG. 8B, at a split portion of the mold frame MLD, due to the structure of the mold frame MLD, in a seam portion where one end of the long-side rubber cushion LRC and one end of the short-side rubber cushion SRC are combined with each other, in view of size tolerance and operability when these rubber cushions LRC, SRC are combined with each other, a gap communicated with the crank-shaped gap G formed in the mold frame MLD is formed.

Due to the formation of the gap G and the gap communicated with the gap G, at the time of assembling or at the time of performing image display, foreign materials such as dusts adhered to the respective constitutional members or dusts floating in peripheral portions of the respective constitutional members intrude toward the inside from the outside through the gap G (that is, toward the direction indicated by an arrow B from an arrow A as shown in FIG. 8B), and these foreign materials intrude into the inside of the liquid crystal display panel mounted on the mold frame MLD.

Further, the foreign materials intruding into the inside of the liquid crystal display panel are adhered to a display screen of the liquid crystal display panel or the like due to heat convection in the inside of the liquid crystal display panel thus causing a display defect or the like at the time of performing image display whereby the brightness distributions of a display image becomes non-uniform. This drawback lowers display quality and also damages quality and reliability of the display image. In the drawing, symbol H indicates a mounting threaded hole formed in the mold frame MLD.

Further, in the liquid crystal display device having such a constitution, image display is viewed in a state that the liquid crystal display panel is arranged in the inside of the cabinet in a laterally extended posture and hence, due to heat convection generated by the backlight, the foreign materials are liable to be concentrated and to stay at four corner portions of the liquid crystal display panel. The stay of the foreign materials becomes particularly conspicuous at the corner portions on a lower side of the display panel.

Here, besides the above-mentioned direct backlight, an edge-light backlight also requires the separation of a backlight depending on a situation such as an exchange of a lamp. In this case, the edge-light backlight also suffers from a drawback substantially equal to the above-mentioned drawback.

Accordingly, the present invention has been made to overcome the above-mentioned drawbacks of the related art, and it is an object of the present invention to provide a liquid crystal display device which can enhance display quality and reliability by preventing the intrusion of foreign materials into the inside of the mold frame thus preventing the adhesion of the foreign materials to a display screen of a liquid crystal display panel.

To achieve the above-mentioned objects, the present invention provides a liquid crystal display device including a liquid crystal display panel, a backlight mounted on a back surface of the liquid crystal display panel, and a mold frame housing the liquid crystal display panel and the backlight, wherein the mold frame is formed in a frame shape by combining a plurality of linear frame members, and joint portions of the frame members are combined with each other by fitting such that the joint portions include regions which overlap each other as viewed in the direction that the joint portions face a surface of the liquid crystal display panel in an opposed manner.

Due to such a constitution, with the use of the connecting portion, an intrusion path of foreign materials is hardly generated and hence, it is possible to overcome the drawbacks of the related art.

Further, the present invention also provides a liquid crystal display device including a liquid crystal display panel, a backlight mounted on a back surface of the liquid crystal display panel, and a mold frame housing the liquid crystal display panel and the backlight, wherein the mold frame is formed in a frame shape by combining a plurality of linear frame members, a plurality of linear first resilient members is provided between the mold frame and the liquid crystal display panel, the first resilient members are adhered in a frame shape along the longitudinal direction of the frame member, and on the joint portions of the frame members, a second resilient member adhered in a state that the second resilient member strides over the plurality of frame members is provided.

Due to such a constitution, an intrusion path of foreign materials is hardly generated and hence, it is possible to overcome the drawbacks of the related art.

According to the liquid crystal display device of the present invention, an intrusion path of foreign materials is hardly generated and hence, the intrusion of the foreign materials into the inside of the mold frame can be prevented whereby the adhesion of the foreign materials to a display screen of the liquid crystal display panel can be eliminated. Accordingly, lowering of display quality is prevented thus bringing about an extremely advantageous effect that display quality and reliability can be largely enhanced.

BRIEF DESCRIPTION OF THE DRAWINGS

FIG. 5A to FIG. 5C are views showing the structure of a corner portion of a mold frame shown in FIG. 1, wherein FIG. 5A is a perspective view showing the manner of combining frame members at the corner portion, FIG. 5B is a plan view of the corner portion, and FIG. 5C is a perspective view of the corner portion;

FIG. 7 is a plan view showing an appearance of a conventional backlight; and

FIG. 8A and FIG. 8B are views showing the structure of a corner portion of a conventional mold frame, wherein FIG. 8A is a perspective view showing the manner of combining frame members at the corner portion, and FIG. 8B is a plan view of the corner portion.

DESCRIPTION OF THE PREFERRED EMBODIMENTS

Hereinafter, preferred embodiments of the present invention are explained in detail in conjunction with drawings showing these embodiments.

Embodiment 1

Figure 1:
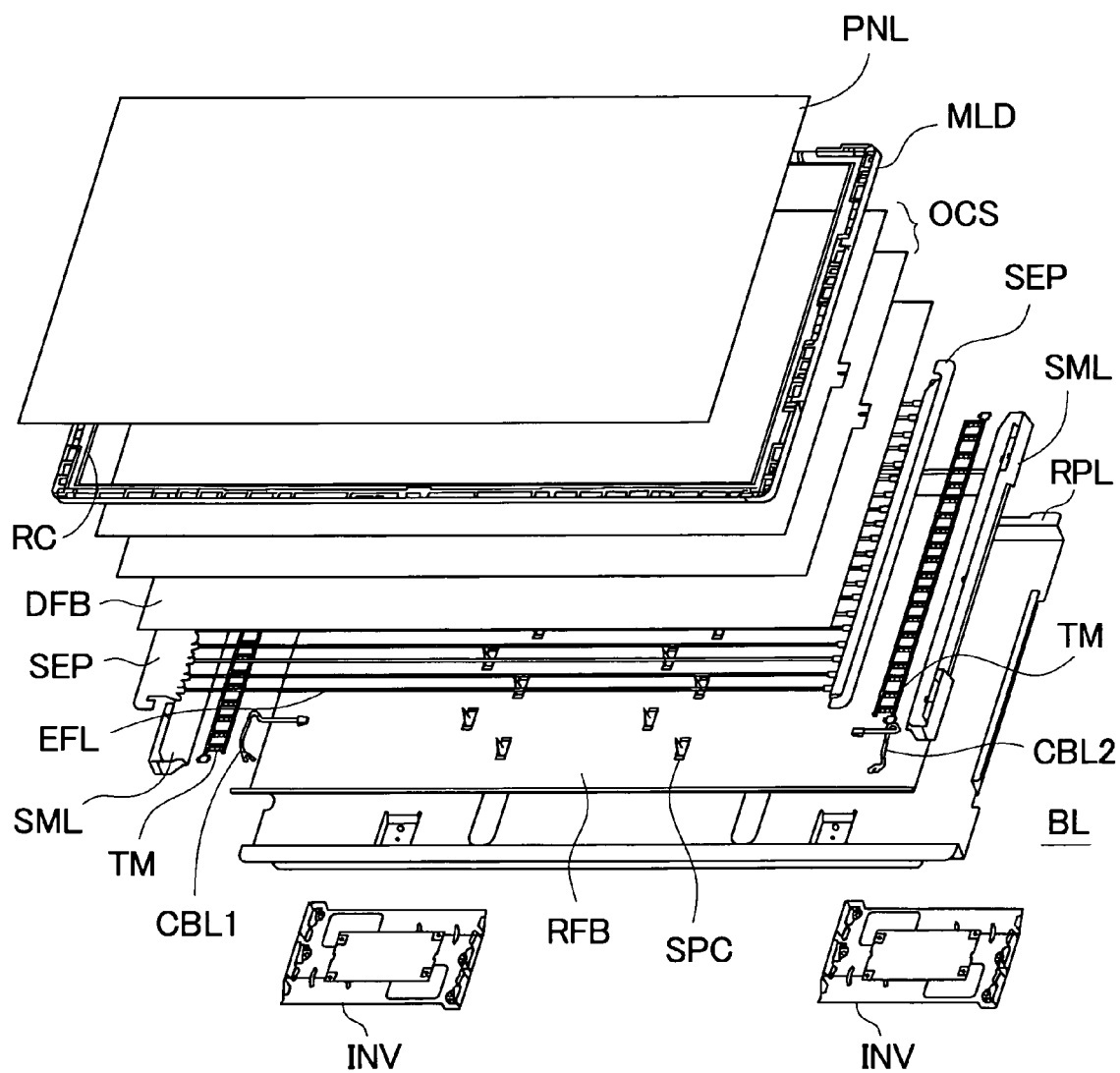
FIG. 1 is an exploded perspective view showing one embodiment of a liquid crystal display device according to the present invention.

FIG. 1 is a developed perspective view of an essential part of a liquid crystal display device for explaining the constitution of the liquid crystal display device of one embodiment according to the present invention. In FIG. 1, a liquid crystal display panel PNL is configured such that a liquid crystal layer is sealed between a pair of light transmitting glass substrates each of which forms pixel selection electrodes on an inner surface thereof. The alignment direction of liquid crystal is changed in response to an electric field applied to the liquid crystal from the pixel selection electrodes. A light-source light projected from a backlight BL mounted on a back surface of the liquid crystal display panel PNL is polarized by the liquid crystal layer at an angle of approximately 90 degrees, and the polarized light is allowed to pass through a polarizer thus forming an electronic latent image into a visible image which can be observed with naked eyes.

The backlight BL mounted on the back surface of the liquid crystal display panel PNL is of a direct light type. The backlight BL of this embodiment is configured such that a reflection sheet RFB, a pair of under frames SEP which includes power supply terminals TM for fixedly holding a plurality of external electrode fluorescent lamps EFL which constitutes a linear light source, a side mold frame SML which covers a connection portion of the external electrode fluorescent lamps EFL and the power supply terminals TM from above, a diffusion plate DFB, and an optical compensation sheet stacked body OCS which is formed by stacking a prism sheet, a diffusion sheet and the like are stacked and arranged in order between a trough-shaped back surface plate RPL which is formed of a metal plate material and a frame-shaped mold frame MLD which is formed of a resin formed body.

Here, in the backlight BL having such a constitution, spacers SPC are mounted on the back surface plate RPL in an erected manner for suppressing the non-uniformity of illumination distribution attributed to the deflection of the large-sized diffusion plate DFB. The spacers SPC are brought into contact with a back surface of the diffusion plate DFB by way of through holes formed in the reflection sheet RFB. Further, the spacers SPC may include the branched projection structure which suppresses the deflection of the elongated external electrode fluorescent lamps EFL. Although not shown in the drawing, the liquid crystal display panel PNL is arranged on the mold frame MLD obtained by assembling rod-shaped frame members each forming a frame member into a frame shape by way of a rubber cushion RC which constitutes a resilient member. Here, the constitutions of these parts are explained in detail later.

Further, on both end sides of a lower side portion of a surface of the back surface plate RPL on a side opposite to a surface of the back surface plate RPL on which the external electrode fluorescent lamps EFL are mounted, a pair of inverter printed circuit boards INV which drives the plurality of external electrode fluorescent lamps EFL while inverting phases of the respective lamps EFL is mounted. The inverter printed circuit board INV mounts an inverter circuit which is constituted of a toroidal-coil-type transformer, an electrolytic capacitor and the like thereon.

Further, in the inverter circuit of the inverter printed circuit board INV, the external electrodes which are mounted on one end side of the plurality of external electrode fluorescent lamps EFL are electrically connected to the power supply terminals TM of the side mold frame SML by way of power supply cables CBL1, CBL2. Here, a high frequency current flows in the power supply cables CBL1, CBL2 and hence, it is preferable to make a length of the cable as short as possible.

Further, drive voltages whose phases are inverted from each other are supplied to the external electrodes formed on both ends of the external electrode fluorescent lamp EFL in synchronism. With respect to the drive voltages, a high frequency output of the inverter circuit is supplied to one external electrode, and a high frequency output whose phase is inverted by the transformer is supplied to another external electrode.

In assembling such a liquid crystal display device, the liquid crystal display panel PNL and the backlight BL are independently assembled in respective steps and, thereafter, the liquid crystal display panel PNL is integrally formed on the backlight BL in an overlapping manner. The backlight BL is obtained by assembling a plurality of constitutional members shown in FIG. 1. That is, the reflection sheet RFB is mounted on the trough-shaped back surface plate RPL, the under frames SEP are mounted on both left and right ends of the reflection sheet RFB, the external electrode fluorescent lamps EFL are set such that the lamps EFL extend between the power supply terminals TM which are formed on both under frames SEP, and the power supply terminal TM portions are covered with the side mold frame SML.

The side mold frame SML includes comb-shaped teeth which are interposed between the external electrode fluorescent lamps EFL. The diffusion plate DFB is arranged on the side mold frame SML, the optical compensation sheet stacked body OCS is stacked on the diffusion plate DFB and, thereafter, the frame-shaped mold frame MLD is arranged on the optical compensation sheet stacked body OCS. Then, these parts are integrally fixed all together using bolts or the like. Finally, the inverter printed circuit boards INV are arranged on both end sides of the lower side portion of the surface of the back surface plate RPL on a side opposite to the surface on which the external electrode fluorescent lamps EFL are mounted and are integrally fixed to the surface using bolts or the like.

Figure 2:
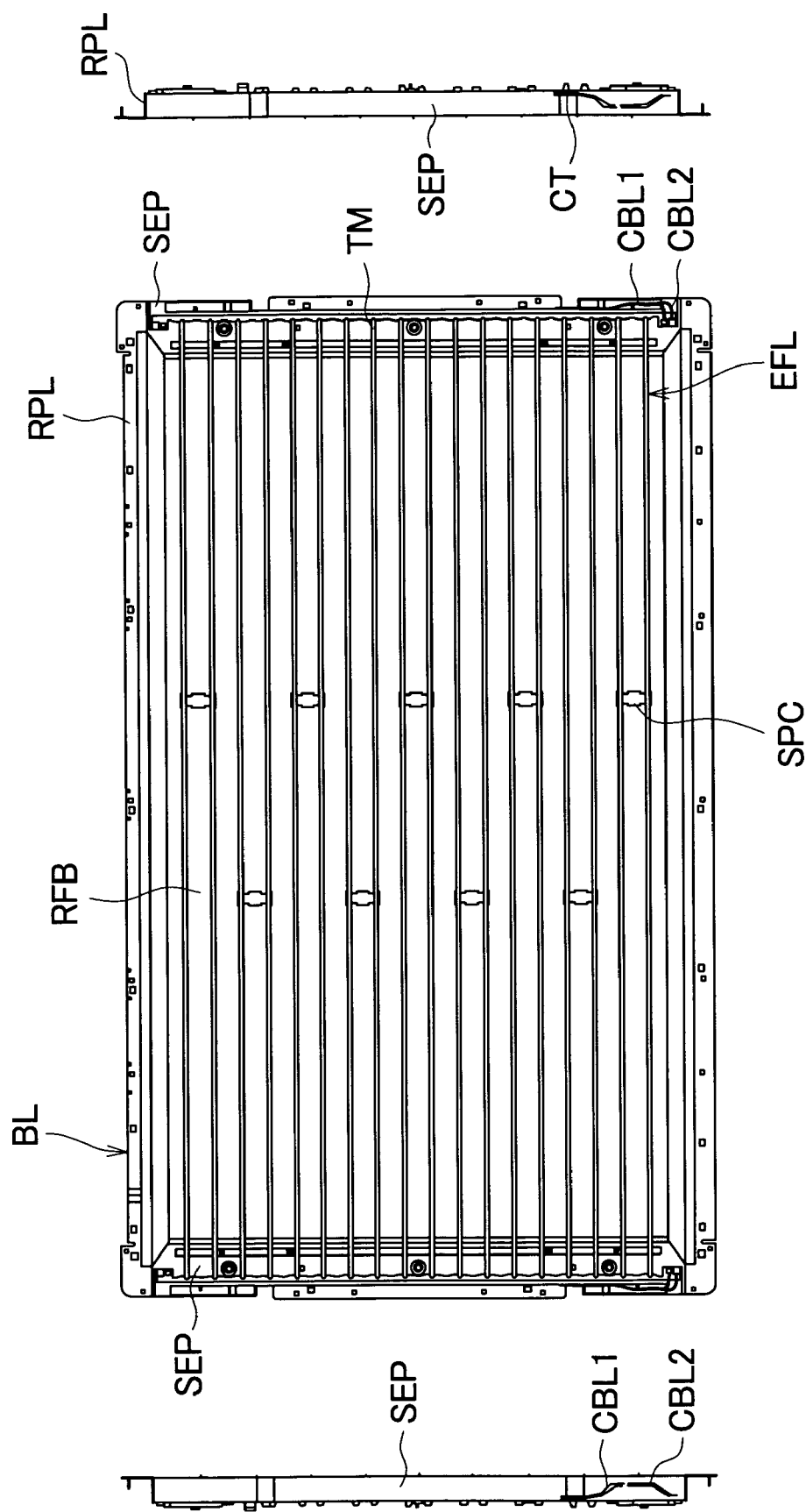
FIG. 2 is a combinational view consisting of a top plan view and side views of a back surface plate shown in FIG. 1 as viewed from a surface of the back surface plate on which external electrode fluorescent lamps are mounted.

FIG. 2 is a plan view of an essential part of the backlight BL. FIG. 2 shows a state in which the external electrode fluorescent lamps EFL are mounted on the under frames SEP above the back surface plate RPL. As shown in FIG. 2, on an inner side (bottom surface) of the trough-shaped back surface plate RPL and on side wall portions of the back surface plate RPL which are obliquely raised up to banks on long sides from the inner side, the reflection sheet is integrally mounted. On both short sides of the back surface plate RPL, the side mold frame SML which covers the power supply terminals TM is arranged.

Figure 3:
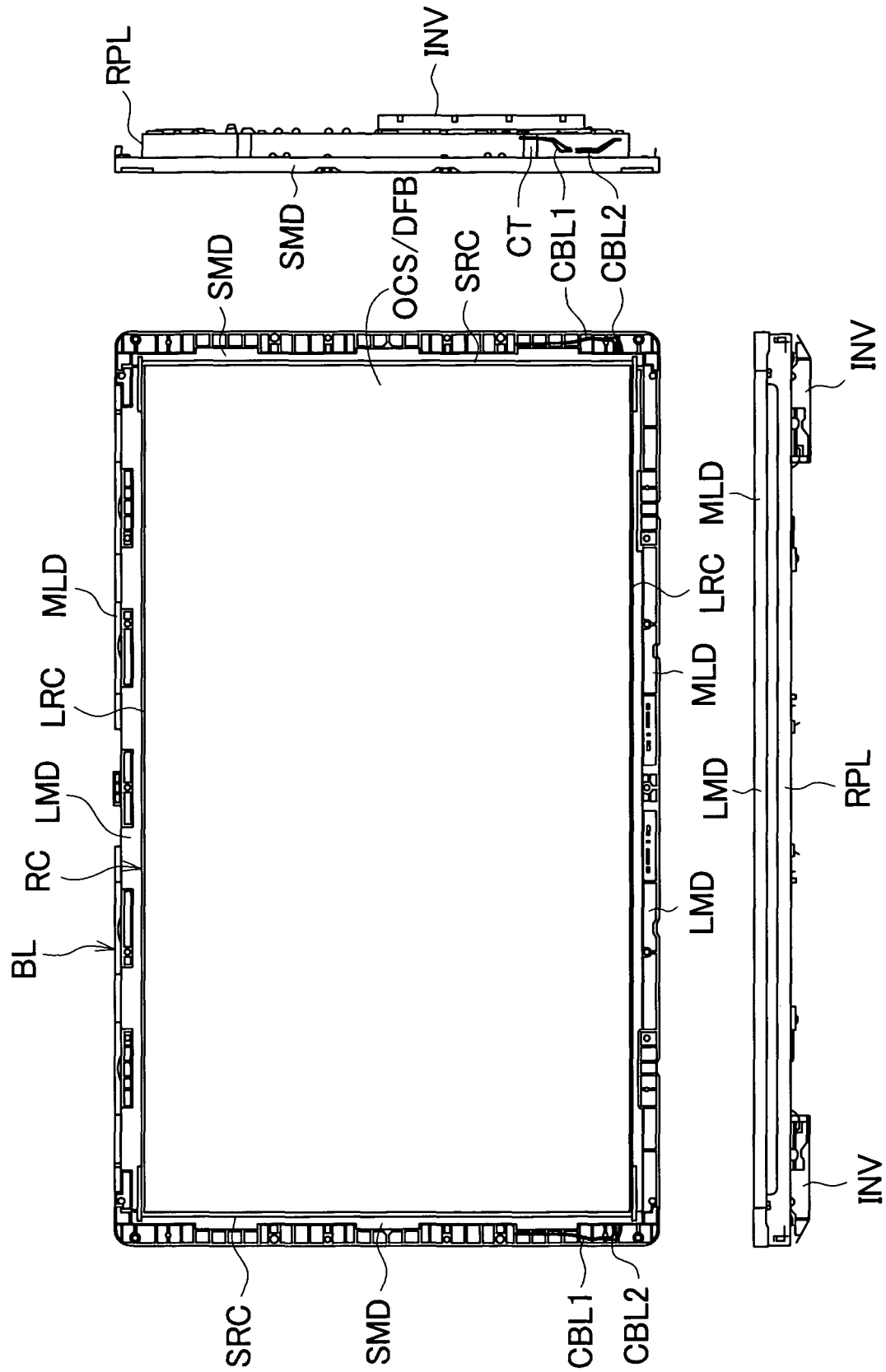
FIG. 3 is a combinational view consisting of a top plan view and side views showing an appearance of a backlight shown in FIG. 1.

FIG. 3 is a perspective view showing an appearance of the liquid crystal display device and the mold frame MLD according to the present invention. As shown in FIG. 3, after mounting the external electrode fluorescent lamps EFL on a side mold frame SMD, the under frames SEP shown in FIG. 1 is arranged in the vicinity of the power supply terminals TM. A diffusion plate DFB and the optical compensation sheet stacked body OCS are overlapped to the under frames SEP. Then, the mold frame MLD described in detail later is mounted on and is fastened to an uppermost portion of the backlight BL using screws.

Figure 4:
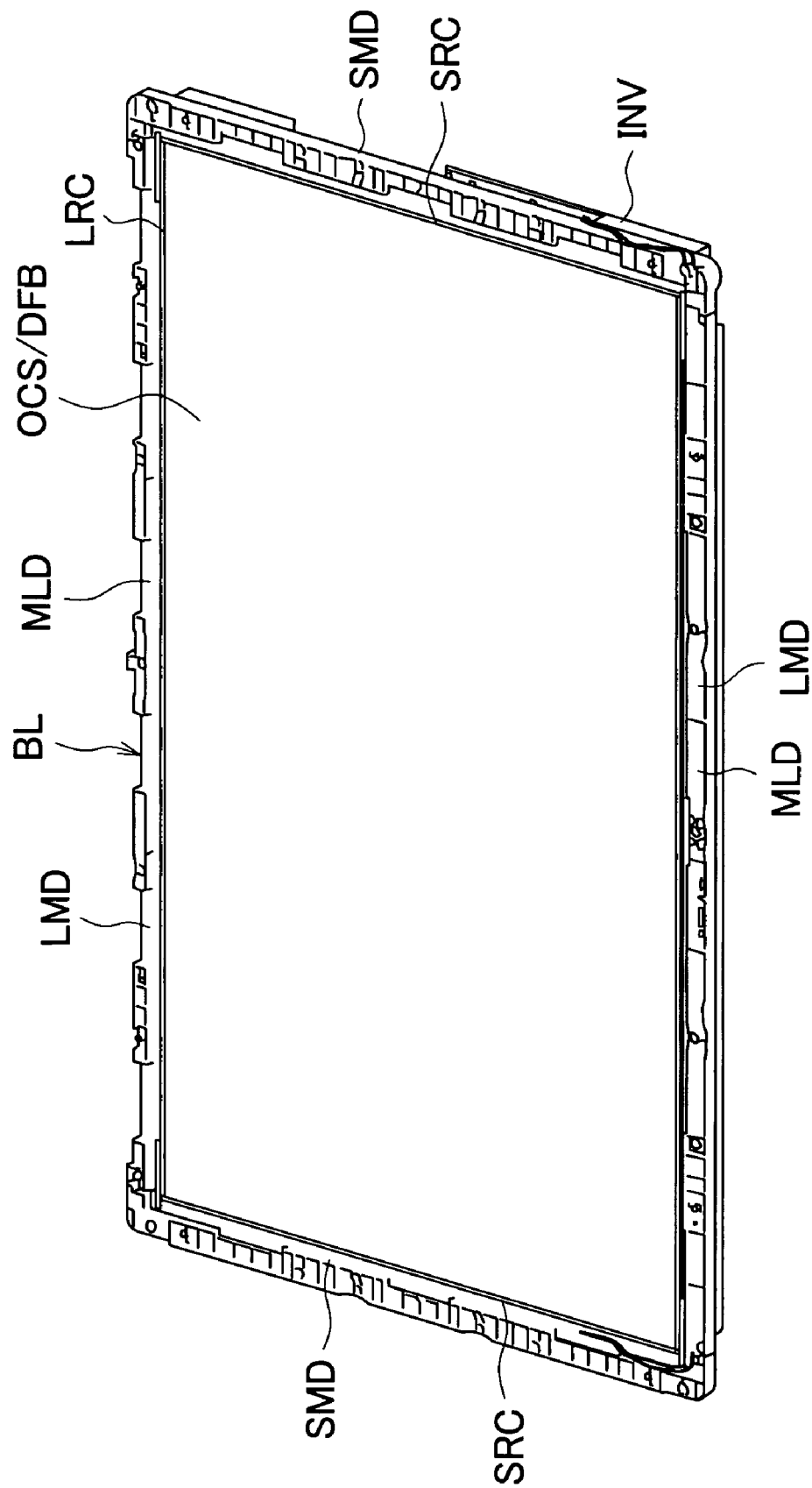
FIG. 4 is a perspective view showing an appearance of the backlight shown in FIG. 1.
Figure 5A:
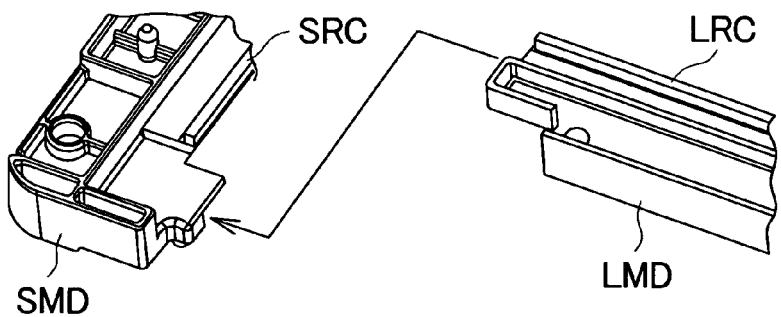
Figure 5B:
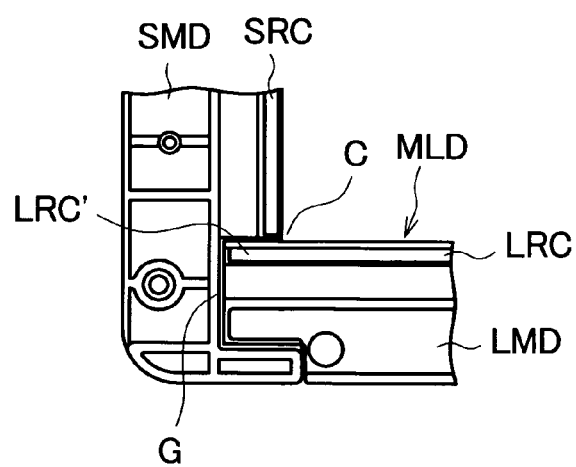
Figure 5C:
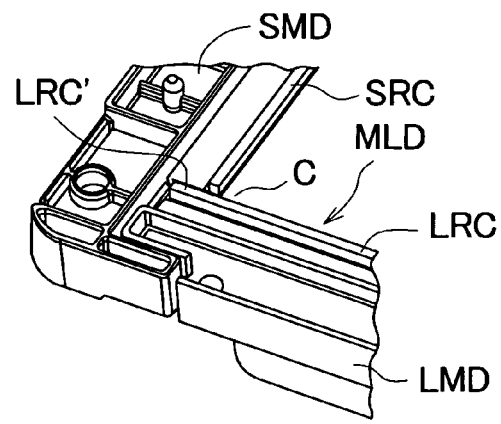

FIG. 4 is a view for explaining the detailed structure of the liquid crystal display device in which the liquid crystal display panel PNL is mounted on the mold frame MLD of the backlight BL which is an essential part of the present invention and mounts the liquid crystal display panel PNL thereon by way of the rubber cushion RC. Further, FIG. 5A to FIG. 5C are enlarged views of an essential part of the mold frame MLD for explaining the constitution of the mold frame MLD, wherein FIG. 5A is a perspective view showing the manner of combining frame members at the corner portion, FIG. 5B is a plan view of the corner portion, and FIG. 5C is a perspective view of the combined corner portion. Parts identical with the corresponding parts in the above-mentioned drawings are given same symbols, and their explanation is omitted.

As shown in FIG. 3 and FIG. 4, the frame-shaped mold frame MLD is a four-split-type mold frame. This split-type mold frame MLD is, for example, formed in a frame shape by combining both end portions of long-side mold frames LMD constituting frame members formed by molding in a rod shape and both end portions of short-side mold frames SMD constituting frame members formed by molding in a rod shape in the direction indicated by an arrow and by joining respective engaging lugs of the mold frames LMD,SMD. Here, in such a constitution, a joint portion of the end portion the long-side mold frame LMD and end portion of the short-side mold frame SMD is configured to ensure a large contact area.

Further, as shown in FIG. 3 and FIG. 4, on an upper surface of a peripheral portion of the frame-shaped mold frame MLD, the rubber cushion RC which is formed by cutting a resilient member formed of a silicon rubber sheet or a resin sheet in a strip shape, for example, is mounted by adhesion. Here, the resilient member is split in four at corner portions of the peripheral portion of the mold frame MLD. With respect to the split portions of the rubber cushion RC at the corner portion, as shown in FIG. 5, on a long-side mold frame LMD, extending portions LRC' formed by extending both end portions of the long-side rubber cushion LRC by an amount larger than a predetermined length are integrally mounted by adhesion. On a short-side mold frame SMD, a short-side rubber cushion SRC having a predetermined length is mounted by adhesion. The end portions of both the long-side rubber cushion LRC and the short-side rubber cushion SRC are arranged to intersect with each other in an approximately T-shape to form a connecting portion C. That is, the connecting portion C is formed by overlapping the extending portions LRC' of the long-side rubber cushion LRC to the end portion of the short-side rubber cushion SRC.

The connecting portion C is formed with the same connecting structure also at other three corner portions of the mold frame MLD. Further, the liquid crystal display panel PNL is integrally mounted on the rubber cushion RC which forms the connecting portion C at four corners of the mold frame MLD thus constituting the liquid crystal display device.

According to the liquid crystal display device having such a constitution, by providing the connecting portion C at the corner portion formed by the end portion of the long-side rubber cushion LRC and the end portion of the short-side rubber cushion SRC in a state that the extending portion LRC' formed by integrally extending the end portion of the long-side rubber cushion LRC intersects the end portion of the short-side rubber cushion SRC at the connecting portion C, at the split portion of the split mold frame, a distance of the gap G can be elongated. Accordingly, an intrusion path of foreign materials into the inside of the mold frame MLD is hardly formed and hence, it is possible to prevent the intrusion of the foreign materials onto a display screen of the liquid crystal display panel PNL. Since the foreign material hardly arrives at the display screen of the liquid crystal display panel PNL, the adhesion of the foreign materials can be eliminated thus preventing lowering of display quality.

Embodiment 2

Figure 6:
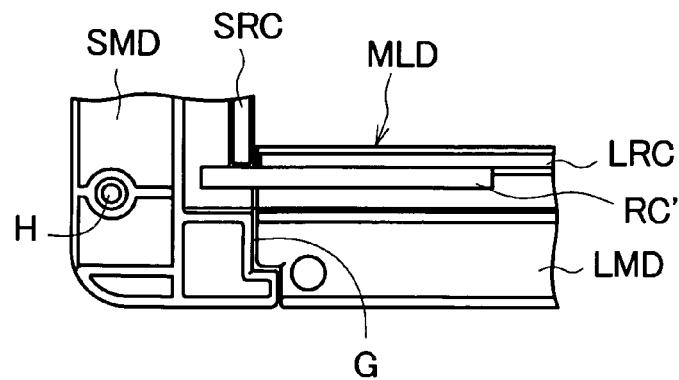
FIG. 6 is a plan view of a corner portion of a mold frame showing another embodiment of a liquid crystal display device according to the present invention.

FIG. 6 is a plan view showing the constitution of a corner portion of a mold frame MLD for explaining another embodiment of the liquid crystal display device according to the present invention. Parts identical with the corresponding parts in the above-mentioned drawings are given same symbols, and their explanation is omitted.

Figure 8A:
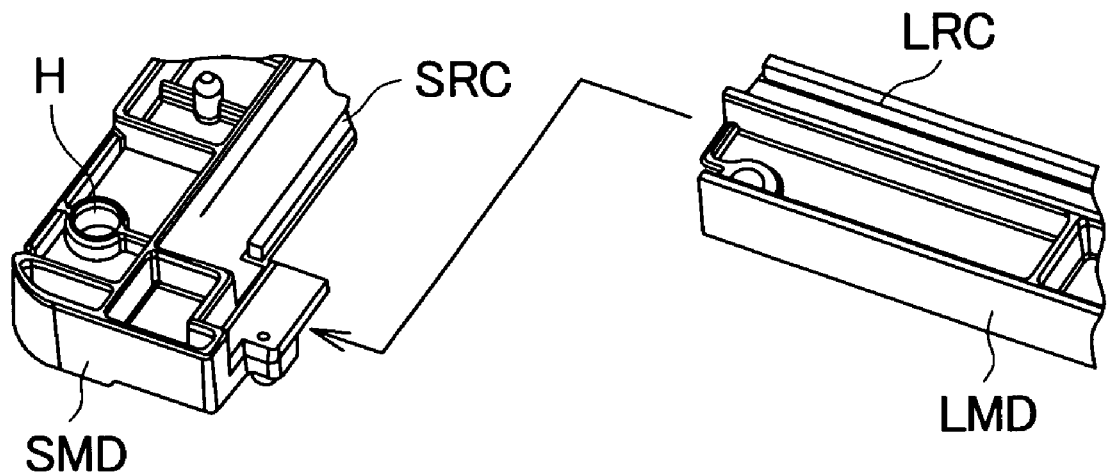
Figure 8B:
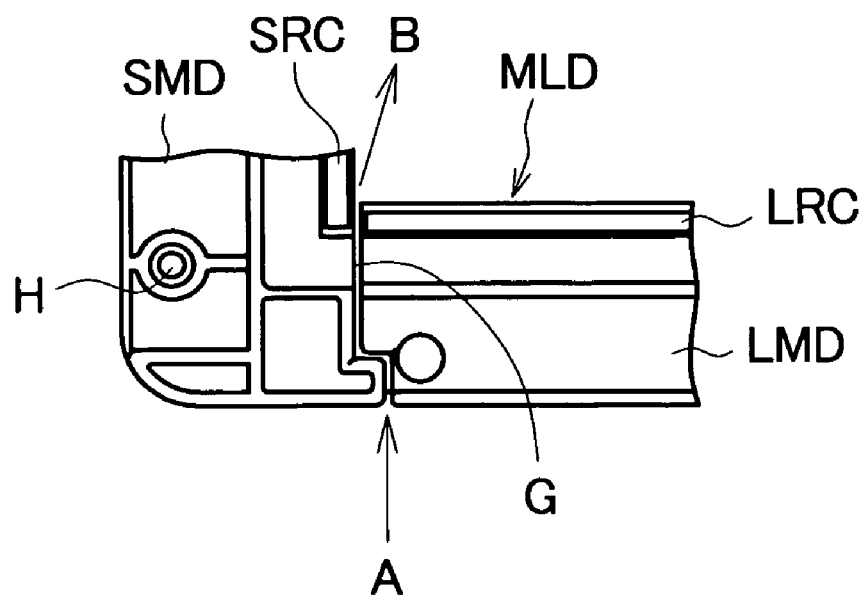

In FIG. 6, the split mold frame MLD differs from the split mold frame MLD shown in FIG. 5 with respect to the constitution of a connecting portion C having the following structure. That is, a rubber cushion RC' constituting a second resilient member and formed of the same member as a long-side rubber cushion LRC is arranged parallel to the long-side rubber cushion LRC such that a gap G is closed outside a joint portion between an end portion of a long-side mold frame LMD and an end portion of a short-side mold frame SMD. That is, the rubber cushion RC' is arranged to close the gap G outside the connecting portion C between the end portion of the long-side rubber cushion LRC and the end portion of the short-side rubber cushion SRC of the conventional structure shown in FIG. 8B.

Also in the liquid crystal display device having such a constitution, by providing the connecting portion C where the rubber cushion RC' is arranged parallel to the long-side rubber cushion LRC at the joint portion between the end portion of the long-side rubber cushion LRC and the end portion of the short-side rubber cushion SRC, the gap G is closed and hence, the intrusion path of the foreign materials is interrupted whereby the intrusion of the foreign materials into the inside of the mold frame MLD can be prevented. Accordingly, the foreign materials hardly arrive at a display screen of a liquid crystal display panel PNL and hence, the adhesion of the foreign materials within an effective display region of the liquid crystal display panel PNL can be eliminated whereby lowering of the display quality can be prevented.

In the above-mentioned embodiments, on a back surface of the back plate RPL, a power source part PCB housing an inverter printed circuit board (power source printed circuit board) therein is mounted, and connectors CT having power supply cables CBL1, CBL2 at the other ends thereof are connected to the inverter printed circuit board INV. Although the inverter printed circuit board INV is arranged at two corner portions, the positions and the number of arrangement portions may be set arbitrarily.

Further, in the above-mentioned respective embodiments, the structure of one corner portion out of four corner portions of the frame-shaped mold frame has been explained in conjunction with drawings. However, in the actual constitution, the same structure is adopted by the joint portion at three remaining corner portions.

What is claimed is:
1. A liquid crystal display device comprising:
a liquid crystal display panel;
a backlight mounted on a back surface of the liquid crystal display panel;
a plurality of optical sheets arranged on the backlight; and
a mold frame arranged between the liquid crystal display panel and the optical sheets, the mold frame housing the liquid crystal display panel, wherein the mold frame is formed in a rectangular framework shape by combining a plurality of straight linear frame members, wherein on joint portions of the straight linear frame members, one of the straight linear frame members has a dent portion, another of the straight linear frame members has a convex portion, the straight linear frame members are combined by the dent portion and the convex portion, and wherein a plurality of elastic members are provided between the straight linear mold frame and the liquid crystal display panel, wherein the elastic members are adhered longitudinally along the straight linear frame members, and wherein the elastic member of the straight linear frame member which has the convex portion is arranged on the convex portion, the end of the elastic member on the frame member which has the dent portion is adjacent with the side of the elastic member on the convex portion.

2. A liquid crystal display device according to claim 1, wherein the elastic member is formed of a resin sheet.

3. A liquid crystal display device according to claim 1, wherein the elastic member is formed of a silicon rubber sheet.

4. A liquid crystal display device comprising:
a liquid crystal display panel;
a backlight mounted on a back surface of the liquid crystal display panel;
a plurality of optical sheets arranged on the backlight; and
a mold frame arranged between the liquid crystal display panel and the optical sheets, the mold frame housing the liquid crystal display panel, wherein the mold frame is formed in a rectangular framework shape by combining a plurality of straight linear frame members, a plurality of linear first elastic members and second elastic members are provided between the straight linear mold frame and the liquid crystal display panel, the first elastic members and the second elastic members are adhered in a frame shape longitudinally along the frame members, and on the joint portions of the frame members, the second elastic member is adhered in a state such that the second elastic member strides over the plurality of frame members, the end of the first elastic member is adjacent with the side of the second elastic member.

5. A liquid crystal display device according to claim 4, wherein the first elastic members are formed of four members.

6. A liquid crystal display device according to claim 4, wherein the second elastic member is adhered to the straight linear frame member in a state that the second elastic member is brought into contact with at least two first elastic members.

7. A liquid crystal display device according to claim 4, wherein the first elastic members are formed of a resin sheet.

8. A liquid crystal display device according to claim 4, wherein the first elastic members are formed of a silicon rubber sheet.

9. A liquid crystal display device according to claim 4, wherein the second elastic member is formed of a resin sheet.

10. A liquid crystal display device according to claim 4, wherein the second elastic member is formed of a silicon rubber sheet.

* * * * *